Jan. 21, 1964     R. Y. CASE     3,118,709
TRACK FOR TRACK-LAYING VEHICLES
Filed Feb. 25, 1960
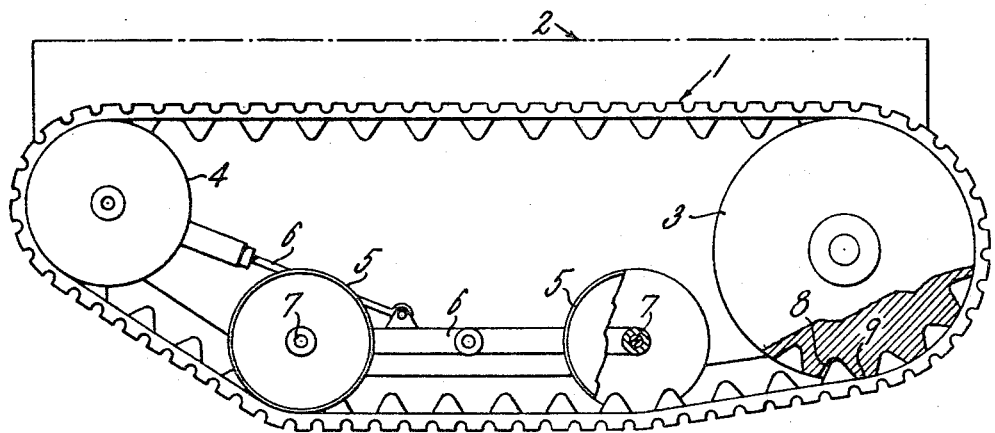
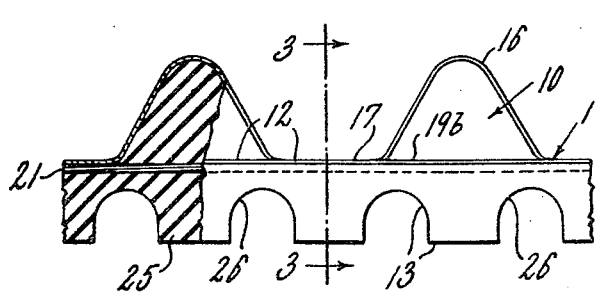
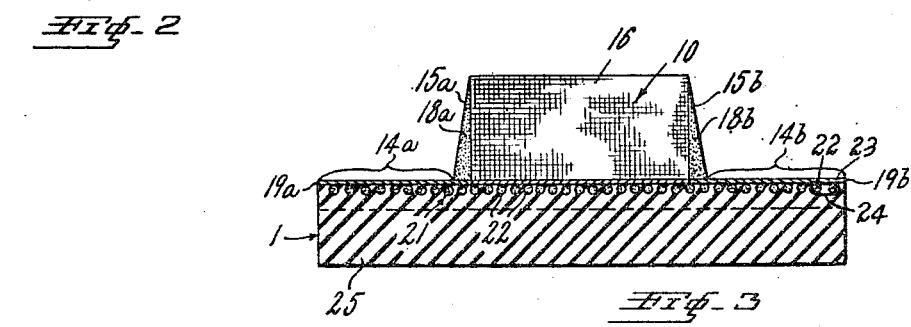
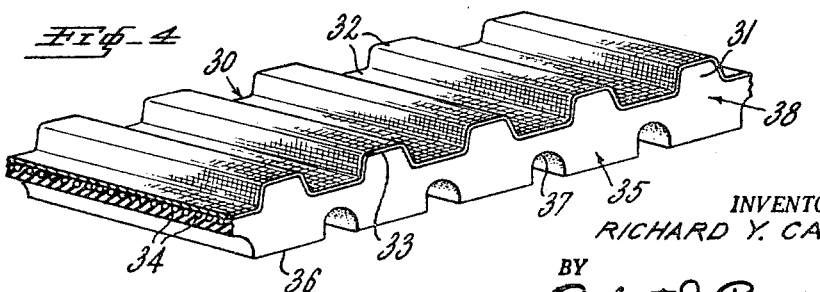
INVENTOR.
RICHARD Y. CASE
BY
Robert J. Patterson
ATTORNEY

United States Patent Office 3,118,709
Patented Jan. 21, 1964

3,118,709
TRACK FOR TRACK-LAYING VEHICLES
Richard Y. Case, Philadelphia, Pa., assignor to United States Rubber Company, New York, N.Y., a corporation of New Jersey
Filed Feb. 25, 1960, Ser. No. 11,005
6 Claims. (Cl. 305—37)

This invention relates to an endless track suitable for use on track-laying vehicles such as agricultural tractors, military vehicles and the like.

Track-laying vehicles provided with two or more endless tracks mounted on suitable carriages are old in the art. To date, these endless tracks have most commonly been comprised of a series of short metal or predominantly metal track sections which are linked together to form endless tracks of suitable lengths. Such metal link tracks, as commonly used on military and civilian vehicles, have the disadvantages of being heavy, noisy, subject to breakdown as the result of wear at any of the many bearing surfaces between links as well as wear upon the treads themselves, subject to freezing to ice or icy roads when left standing on such surfaces, time consuming to repair, and prohibited from traveling on most paved highways.

Endless all-rubber tracks for vehicles have also been known, if not much used in practice, for many years. Most of such tracks, with or without metal attachments, have commonly been designated for use over conventional vehicle tires mounted as dual wheels or as auxiliary wheels. See, for example, U.S. Patent No. 2,898,965 to Eddy. Also, as disclosed in U.S. Patent No. 2,476,460 to Smith, attempts have been made to employ a reinforced endless rubber track as a track for more conventional track-laying vehicles. The track described in this latter patent comprises a rubber band reinforced with metal tension members and driven by means of a pulley engaging endless V-belt-like projections extending circumferentially around the interior surface of the track. In all of the aforementioned applications of endless rubber vehicle tracks it has been found that serious detracking problems are encountered when corners are turned or when a vehicle provided with such tracks travels on the side of a hill or over rough ground.

Applicant's invention lies in the employment of the principle of the reinforced toothed belt as disclosed in U.S. Patent No. 2,507,852 to the applicant, in the design and construction of endless, reinforced rubber bands peculiarly suited for use as vehicle tracks and the application of said bands to said use. Such tracks have been found not to be subject to detracking in service and to be, in comparison with metal link tracks, long wearing without failure, relatively cheap to manufacture, not subject to freezing to ice, suitable for relatively silent travel and for travel at relatively high speeds, relatively easy to replace on the vehicle as a unit, lightweight and non-destructive to paved highways.

It is an object of this invention to provide a track for track-laying vehicles having the qualities of long wear, light weight, relatively inexpensive construction and suitability for relatively silent and high speed travel.

It is another object of this invention to provide a rubber tread bearing endless track for vehicles which will not detrack when said vehicles turn or travel on sloping or uneven ground.

It is a further object of this invention to provide an endless track for track-laying vehicles which will not freeze to ice when the vehicle is stationary and which will be legal to operate on conventional paved highways.

For better understanding of the present invention together with other further objects thereof, reference is had to the following description, taken in connection with the accompanying drawings, and the scope will be pointed out in the appended claims.

In the drawings:

FIG. 1 is a schematic representation of the track of applicant's invention installed on a tractor or similar vehicle wherein certain parts are omitted or broken away for the purpose of more clearly showing how applicant's track is fitted to the vehicle.

FIG. 2 is a side elevational view, partially broken away, of a short section of applicant's endless track.

FIG. 3 is a sectional view on line 3—3 of FIG. 2.

FIG. 4 is an isometric view of a short section of an endless track which is a modification of applicant's invention.

Referring now to the drawings, wherein like reference numerals denote corresponding parts throughout the several views, in the FIG. 1, the track 1 of applicant's invention is shown mounted upon a tractor or similar vehicle 2. As is shown, the endless track 1 is mounted on the undercarriage of the tractor 2 which comprises a drive pulley 3, an idler pulley 4, two or more pairs of bogey wheels 5 and suitable structural or mechanical members 6 for linking together some or all of the undercarriage components. The drive pulley 3 and the tail pulley 4 are provided with suitable grooves 8 defining teeth 9 spaced at intervals around the circumferences thereof and so constructed and arranged as to receive successively in engagement the teeth 10 of the track 1. The bogey wheels 5 are mounted on axles 7 in pairs and are spaced so that one of each pair of bogey wheels rides on the track 1 on each side of the teeth 10.

Referring now to FIG. 2 which shows a preferred form of applicant's invention, the track 1, only a short section of which is shown, is a unitary structure having an inner surface 12 and an outer surface 13. Projecting from the inner surface 12 of the track 1 are a plurality of regularly spaced teeth 10 extending transversely across said inner surface 12 perpendicular to the direction of travel of the track 1 but not extending completely across said inner surface 12. The profile of these teeth 10, as shown in FIG. 2, will vary depending upon the design of the pulleys 3 and 4 and other factors common to the gear and toothed belt art, but will usually, in order to minimize tooth wear and flexure, be such that there will be no interference between the teeth 10 and the teeth 9 on the pulleys 3 and 4 as said teeth 9 and 10 engage and disengage in operation.

As is best seen in FIG. 3, by virtue of the teeth 10 not extending completely across the inner surface 12 of the track 1, the inner surface 12 is provided with two flat surfaces 14*a* and 14*b* extending around the entire inner circumference of the track 1 on either side of the teeth 10. These surfaces 14*a* and 14*b* are at least of sufficient width to permit the bogey wheels 5 of the tractor 2 to travel thereon, one of each pair of bogey wheels 5 traveling on each side of the teeth 10. Also as is shown in FIG. 3, the end surfaces 15*a* and 15*b* of the teeth 10 are inclined so that each pair of bogey wheels 5 will easily engage successively the teeth 10 between them when the vehicle 2 fitted with the track 1 is operated.

The toothed portion of the inner surface 12 of the track 1 is formed by a continuous strip 16 of a suitable fabric, such as a nylon duck having 42 warp threads per inch and 37½ fill threads per inch and weighing 8.09 ounces per square yard, precoated with a suitable resin or rubber compound such as neoprene cement. This strip 16 of fabric extends around the entire inner periphery of the track 1 following the contours of the teeth 10 and the dedendum surfaces 17 therebetween. Because of the inclined end faces 15a and 15b of the teeth 10, the strip 16 of fabric covering the teeth is cut only as wide as the narrowest width of the teeth 10 at the top thereof, the result being that wedge shaped portions 18a and 18b of the side surfaces of the teeth 10 are left free of fabric covering. Two additional strips 19a and 19b of the same fabric are applied to the flat portions 14a and 14b of the inner surface 12 of the track 1 so as to butt, edge to edge, with the tooth covering fabric strip 16 around the entire circumference of the track 1. Because of the inclined end surfaces 15a and 15b of the teeth 10, the side fabric strips 19a and 19b extend beneath the ends of the teeth 10.

Immediately adjacent to and touching the fabric strips 19a and 19b and the fabric strip 16 where it lies at the dedendum line 17 of the teeth 10 is provided a strain resisting member 21 comprised of a plurality of turns 22 of a continuous strand of brass plated steel wire wound as a helix around the entire circumference of the track 1, each turn 22 of the wire strain resisting member 21 being shown in section in FIG. 3. These turns 22 are evenly spaced across the entire width of the track 1 except for a narrow strip approximately ⅛" wide, which is free of wire, at each edge of the track 1. The strain resisting member 21 carries substantially the entire working load imposed upon the track 1, and, under the maximum load for which the track is designed, the member 21 is substantially inextensible. The ends of the wire member 21 are secured to the adjacent turns 22 of said wire member at either edge of the track 1 by soldering, clamping or other means. In FIG. 3, an end 23 of the wire member 21 is shown in section secured by a clamp 24 to the adjacent turn 22 of said wire member 21.

Between the strain resisting member 21 and the outer surface 13 of the track 1 is a heavy layer of tread 25. As shown in FIG. 2, this tread layer 25 may be provided with grooves 26 for purposes of better traction. While the grooves 26 shown in FIG. 2 are simple transverse grooves which may be cut or ground after the manufacture of the track 1 is completed, if such tracks were made in sufficient volume of manufacture to warrant the investment in suitable molds, then any desired groove pattern could be applied by molding to the tread 25. When relatively deep grooves 26, as shown, are used, it is desirable that such grooves be spaced regularly with respect to the teeth 10 so that points of minimum thickness and, consequently, maximum flexibility will occur at regular intervals throughout the circumferential length of the track 1.

The tread layer 25 extends into the interstices between the turns 22 of the tension member 21 to join the body of the teeth 10 and to contact the fabric strips 14a, 14b and 16. When the fully assembled track has been vulcanized the tread layer 25 and the teeth 10 are firmly bonded together and to the tension member 21 and to the fabric strips 14a 14b and 16, thereby constituting a unitary structure in the form of a uniformly flexible endless band.

In FIG. 4 is shown a modification of applicant's invention. The teeth 31 in this endless track 30 extend across the entire width of the inner surface 32. While the teeth 31 are shown to have a profile differing from that of the teeth 10 in FIG. 2, the same profile could readily be applied to the teeth 31 on track 30. Otherwise the construction of track 30 is much the same as that of track 1. A single strip of wear resistant fabric 33 forms the entire inner surface 32 following the contours of the teeth 31. The strain resisting member 34 is positioned immediately adjacent the fabric 33 where said fabric 33 follows the dedendum line of the teeth 31. A layer of tread 35 is provided between the strain resisting member 34 and the outer surface 36, and a regular pattern of grooves 37 are cut or molded therein.

In operative use, the track 1 of FIGS. 1, 2 and 3 is driven by the drive pulley 3, the teeth 10 of the track 1 successively engaging the teeth 9 on the drive pulley 3. Because the strain resisting member 21 lies substantially on the dedendum line of the teeth 10, the track teeth 10 move into and out of mesh with the drive pulley teeth 9 without any effective change of pitch and are prevented from climbing up and out of the grooves 8 between the pulley teeth 9 as the result of lateral forces applied to the track 1 when the vehicle 2 is turning or traveling on the side of a hill. Track 1, in turn, drives idler pulley 4, which is provided with teeth similar to those on drive pulley 3. Each pair of bogey wheels 5 rolls on the flat portions 14a and 14b of the track 1, one on each side of the teeth 10. The inclined end surfaces 15a and 15b of the teeth 10 serve to guide the bogey wheels 5 and the track 1 into proper relative position.

The track 30, shown in FIG. 4, is used in much the same manner. However, since the teeth 31 extend across the entire transverse width of the track 30, it would be necessary to provide, on the drive and idler pulleys and on the bogey wheels, flanges guiding against the sides 38 of the track 30.

The track 1 is manufactured in a mold similar, except for size to that shown in FIGS. 6 and 7 of U.S. Patent 2,507,852 to Case. The method of making the track 1 is also similar to the method of making the reinforced toothed belt disclosed in that patent. The mold for making the track 1 differs from that shown in the aforementioned Case patent in that the grooves in the mold ring do not extend across the entire width of said mold ring and, in general, conform in shape to the shape of the teeth 10.

In making the track 1, the strip of suitable fabric 16, precoated with a tacky rubber cement, is inserted into one of the grooves in the mold ring. A precut piece of extruded tooth stock is then inserted into the groove over the fabric and pressed firmly into place. This operation is repeated until the fabric 16 surrounds the circumference of the mold ring and all of the grooves have been filled with tooth stock. Next the two additional strips of precoated fabric 19a and 19b are firmly pressed onto the entire circumference of the mold ring, being so positioned as to butt, edge to edge, with the strip 16 previously applied. Next the strain resisting member 21 is wound helically directly over the fabric 16, 19a and 19b and the bases of the teeth 10, the ends of the strain resisting member 21 being clamped to the adjacent turns. A thin coating of rubber cement may then be applied to facilitate tread application. Thereafter, the tread 25 is applied by winding and pressing onto the previously assembled components a multiplicity of plies of a relatively thin (.062 gage) calendered rubber sheet. The completely built track is then cured as described in the aforementioned Case patent, and the tread grooves are thereafter cut into the tread by any suitable cutting means.

While the foregoing description has been presented in terms of a reinforced rubber track, it should be noted that other suitable resilient materials, such as polyurethane, having generally the same in-service properties as soft resilient rubber may be used. The materials used for the tooth bodies and tread, if different, must be bondable to each other and to the strain resisting member. In actual practice of the invention, it has been found that a rubber compound generally similar to automobile tire tread stock giving a Shore Durometer (scale "A") reading of 60 to 75 is suitable for both teeth and tread.

Similarly, while in actual practice of the invention a single helically wound strain resisting member formed from a plurality of turns of stranded, brass-plated .081 inch diameter steel wire constructed 7 x 3 x .013" and having a minimum tensile rating of 770 lbs. and an ultimate elongation at break of 5% has been found to be satisfactory, it is not intended that the invention be limited to this type of strain resisting member. A plurality of strands may be helically wound in the same layer or additional reinforcing elements could be added exterior to the strain resisting member positioned substantially on the dedendum line of the teeth. However, it is necessary to the invention that whatever strain resisting member is used be flexible, bondable to the tooth and tread material, substantially inextensible at working loads and so located that its inner periphery is substantially on the dedendum line of the teeth.

In this application, the term "circumferential" is used as an adjective to describe a thing extending through and in a direction perpendicular to a transverse section of the endless track and entirely around said endless track, but not necessarily on the outer perimeter of said track.

While the preferred form of this invention has been described herein more or less in detail, it will be understood that changes therein, including omission of the fabric covering from the inner surface or the addition of attachments or embedded lateral stiffeners, may be made without departing from the spirit of the invention or the scope of the appended claims.

Having thus described my invention, what I claim and desire to protect by Letters Patent is:

1. A track for a track-laying vehicle comprising an endless band having an inner surface and an outer surface, said band including resilient teeth on the inner surface thereof, fabric covering at least part of the inner surface of said band which conforms to the contours thereof and extends, between said teeth, along the dedendum line thereof, a single strain resisting member adapted to carry substantially the entire working load on said band, said member being composed of a plurality of circumferential turns of a continuous length of flexible high tensile strength wire, all of said turns of wire in said member between the turns adjacent to the outer edges of said band lying in a single layer, said strain resisting member being located substantially on the dedendum line of said teeth and separated from said fabric covering only by a film of bonding material, a layer of resilient tread adjacent to the outer surface of said band, said tread layer and said teeth being bonded together and to said strain resisting member and to said fabric.

2. A track for a track-laying vehicle comprising an endless band having an inner surface and an outer surface, said band including rubber composition teeth on the inner surface thereof, fabric covering at least part of the inner surface of said band which conforms to the contours thereof and extends between the teeth along the dedendum line thereof, a single strain resisting member adapted to carry substantially the entire working load on said band, said member being composed of a plurality of circumferential turns of a continuous length of flexible high tensile strength wire, the ends of said wire being secured at the outer edges of said member, all of said turns of wire in said member between the turns adjacent to the outer edges of said member lying in a single layer, said strain resisting member being located substantially on the dedendum line of said teeth and separated from said fabric covering only by a film of bonding material, a layer of rubber composition tread adjacent to the outer surface of said band, said tread layer being provided with traction grooves so arranged, relative to said teeth on said inner surface, as to provide uniformly distributed points of maximum flexibility throughout the circumferential length of said band, said tread layer and said teeth being vulcanized together and to said strain resisting member and to said fabric.

3. A track for a track-laying vehicle having a drive pulley provided with track-driving teeth, said track comprising an endless band having an inner surface and an outer surface, said band including: a plurality of circumferentially spaced, resilient, yieldable organic plastic teeth on the inner surface of said band, said teeth being adapted to mesh with the teeth on said drive pulley of said vehicle; an endless strain resisting member adapted to carry substantially all of the tensile working load to be imposed on said band, said member consisting of a single layer of laterally spaced, uniformly flexible circumferential strands, the inner periphery of all of said strands of said member lying substantially on the dedendum line of said organic plastic teeth; wear resistant fabric covering for at least part of the inner surface of said band; and a continuous layer of resilient, yieldable plastic tread adjacent to the outer surface of said band; said teeth and said tread layer being bonded together and to said member and to said fabric by organic plastic material filling the spaces between said strands.

4. A track for a track-laying vehicle having a drive pulley provided with track-driving teeth, said track comprising an endless band having an inner surface and an outer surface, said band including: a plurality of circumferentially spaced, resilient, yieldable organic plastic teeth on the inner surface of said band, said teeth being adapted to mesh with the teeth on said drive pulley of said vehicle; an endless strain resisting member adapted to carry substantially all of the tensile working load to be imposed on said band, said member consisting of a single layer of uniformly flexible, high tensile strength strands formed into a plurality of laterally spaced circumferential turns, the inner periphery of all of said turns of said member lying substantially on the dedendum line of said organic plastic teeth; wear resisting fabric covering for at least part of the inner surface of said band; and a continuous layer of resilient, yieldable plastic tread adjacent to the outer surface of said band; said teeth and said tread layer being bonded together and to said member and to said fabric by organic plastic material filling the spaces between said turns.

5. A track for a track-laying vehicle having a drive pulley provided with track-driving teeth, said track comprising an endless band having an inner surface and an outer surface, said band including: a plurality of circumferentially spaced, resilient, yieldable organic plastic teeth on the inner surface of said band, said teeth being adapted to mesh with the teeth on said drive pulley of said vehicle; an endless strain resisting member adapted to carry substantially all of the tensile working load to be imposed on said band, said member consisting of a plurality of laterally spaced, circumferential turns of a continuous, uniformly flexible, high tensile strength strand lying in a single layer, the inner periphery of all of said turns of said member lying substantially on the dedendum line of said organic plastic teeth; wear resistant fabric covering for at least part of the inner surface of said band; and a continuous layer of resilient, yieldable plastic tread adjacent to the outer surface of said band; said teeth and said tread layer being bonded together and to said member and to said fabric by organic plastic material filling the spaces between said turns.

6. A track for a track-laying vehicle having a drive pulley provided with track-driving teeth, said track comprising an endless band having an inner surface and an outer surface, said band including: a plurality of circumferentially spaced, resilient, yieldable organic plastic teeth on the inner surface of said band, said teeth being adapted to mesh with the teeth on said drive pulley of said vehicle; an endless strain resisting member adapted to carry substantially all of the tensile working load to be imposed on said band, said member consisting of a plurality of laterally spaced circumferential turns of a continuous, uniformly flexible, high tensile strength steel wire lying in a single layer, the inner periphery of all of said turns of said wire lying substantially on the dedendum line of said organic plastic teeth; wear resistant fabric covering for at least part of the inner surface of said band; and a continuous layer of resilient, yieldable plastic tread adjacent to the outer surface of said band; said teeth and said tread layer being bonded together and to said member and to said fabric by organic plastic material filling the spaces between said turns.

References Cited in the file of this patent

UNITED STATES PATENTS

| | | |
|---|---|---|
| 1,790,431 | Legros | Jan. 27, 1931 |
| 2,040,696 | Johnston | May 12, 1936 |
| 2,350,076 | Smith | May 30, 1944 |
| 2,592,542 | Curtis | Apr. 15, 1952 |
| 2,761,745 | Atkinson | Sept. 4, 1956 |

FOREIGN PATENTS

| | | |
|---|---|---|
| 38,849 | Denmark | May 26, 1928 |
| 1,006,365 | France | Jan. 23, 1952 |